(No Model.) 3 Sheets—Sheet 2.
T. WALTON.
APPARATUS FOR MANUFACTURING GLASS TUMBLERS.
No. 346,181. Patented July 27, 1886.
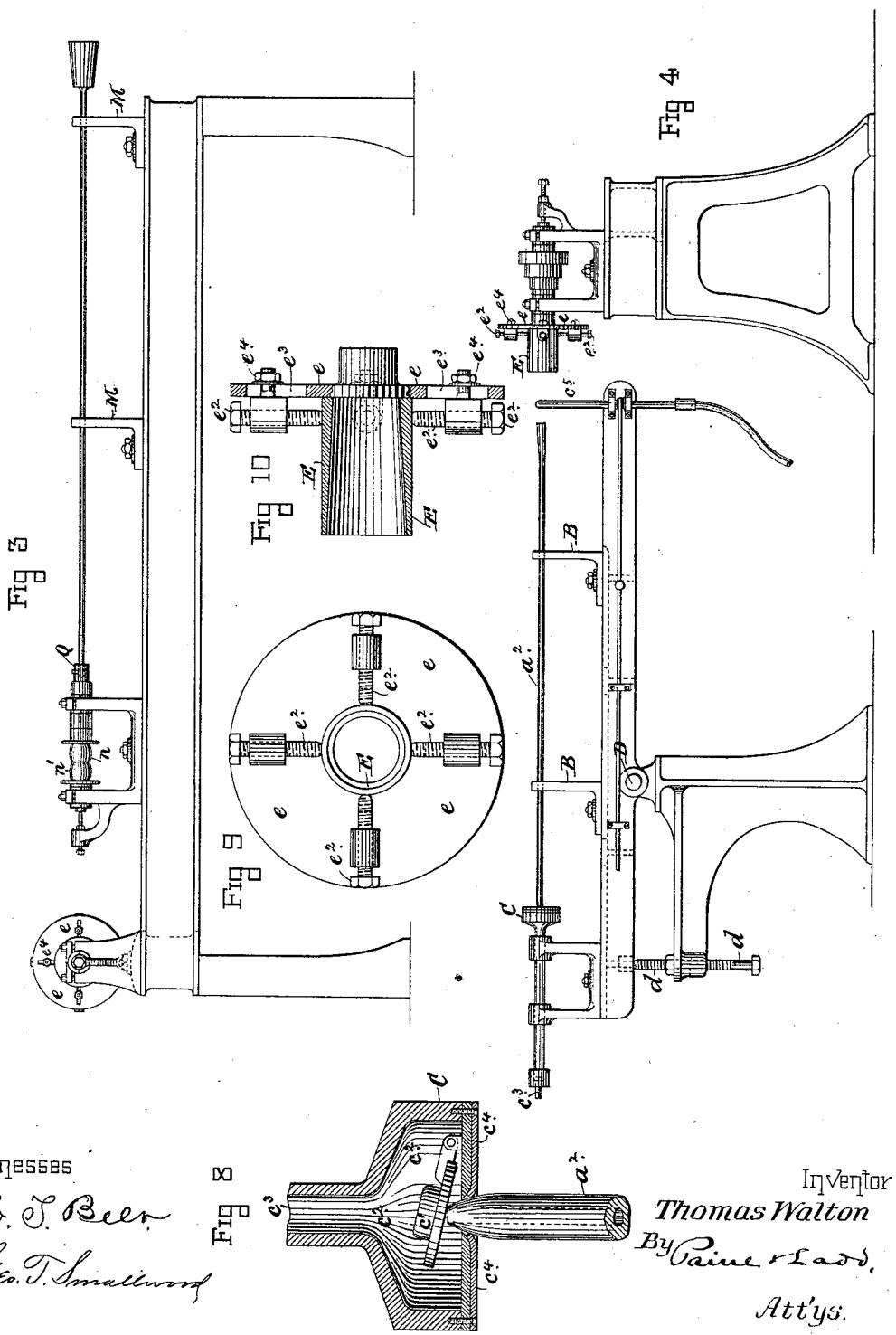
Witnesses
Inventor
Thomas Walton
By Paine & Ladd,
Att'ys.

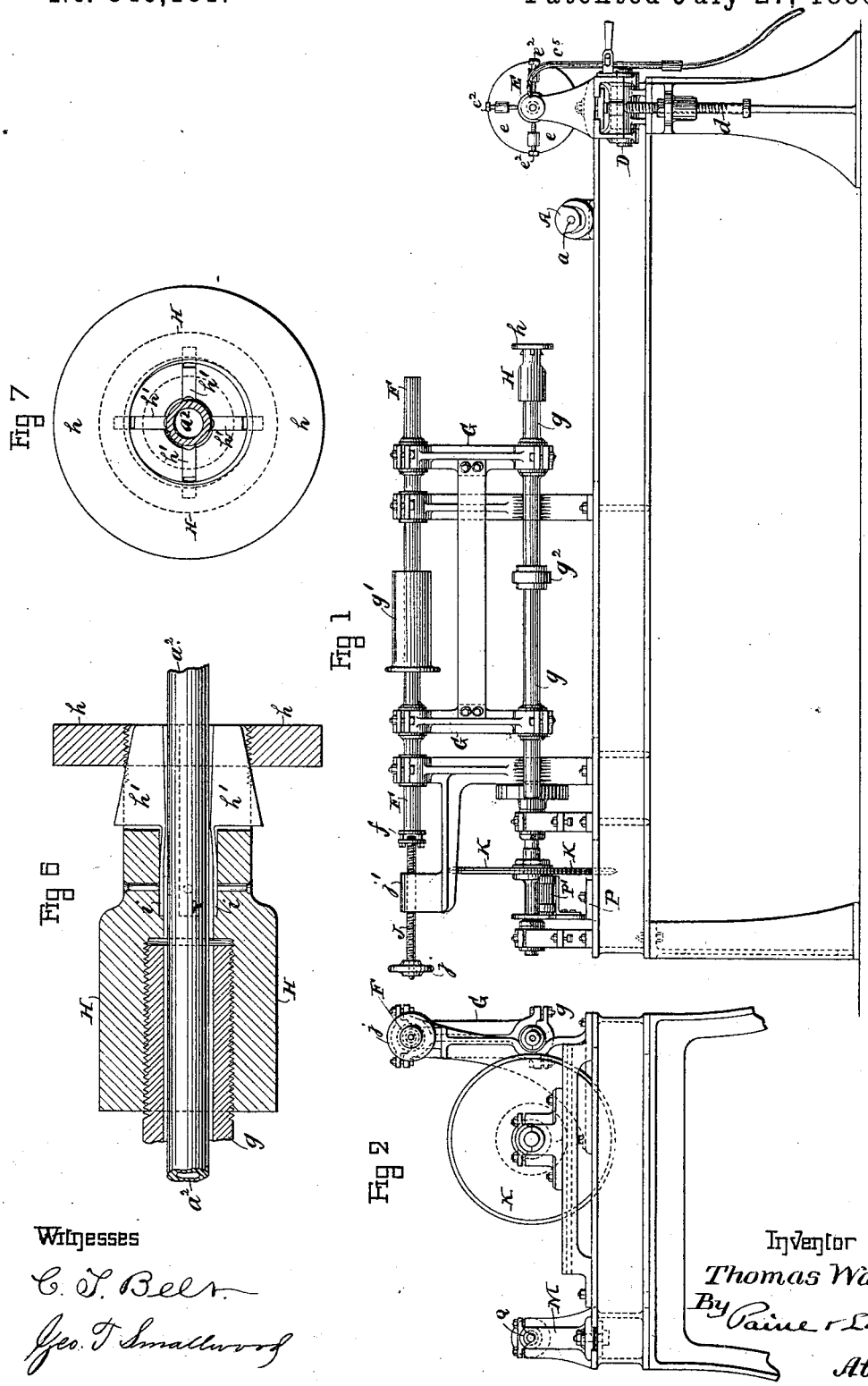

(No Model.) 3 Sheets—Sheet 3.
T. WALTON.
APPARATUS FOR MANUFACTURING GLASS TUMBLERS.
No. 346,181. Patented July 27, 1886.
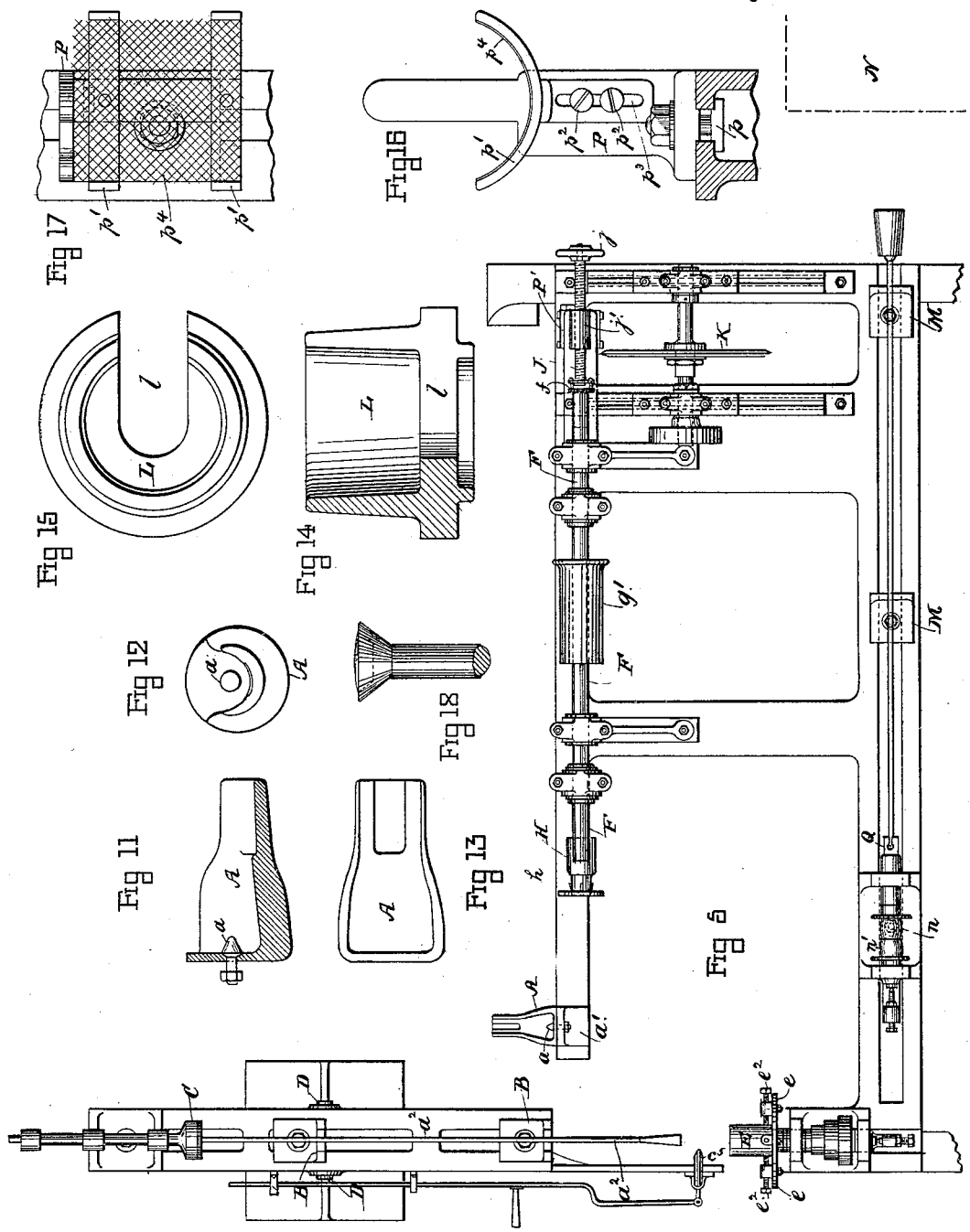
Witnesses.
C. J. Belt
Geo. T. Smallwood
Inventor.
Thomas Walton
By Paine & Ladd,
Attys.

UNITED STATES PATENT OFFICE.

THOMAS WALTON, OF NEWTON LE WILLOWS, COUNTY OF LANCASTER, ENGLAND.

APPARATUS FOR MANUFACTURING GLASS TUMBLERS.

SPECIFICATION forming part of Letters Patent No. 346,181, dated July 27, 1886.

Application filed July 21, 1885. Renewed May 27, 1886. Serial No. 203,490. (No model.)

*To all whom it may concern:*

Be it known that I, THOMAS WALTON, of Newton le Willows, in the county of Lancaster, Kingdom of England, have invented certain new and useful Improvements in Apparatus for Manufacturing Tumblers and Like Articles of Glass, of which the following is a specification.

This invention has for its object an apparatus for manufacturing tumblers, wine-glasses, moons, and other glass hollow-ware, especially those articles usually made from flint glass, doing by machinery instead of by hand, as heretofore.

Hitherto the manufacture of tumblers and the like has been accomplished almost entirely by hand and by highly-skilled labor, the apparatus required being very elementary. Now, my invention is designed to do it by machinery, and to enable men and boys not well skilled in the art to perform what has hitherto been done only by very highly-skilled workmen.

Referring to the drawings, Figure 1 is a front view of the machine used, showing the principal parts; Fig. 2, an end view of same; Fig. 3, a view of back of machine; Fig. 4, another end view, and Fig. 5 a plan of the machine. The remaining figures are enlarged views of details.

I will describe the apparatus and process at the same time, but reserve my right to make a fresh application for the process in another patent. I gather the metal on a blow-pipe or iron, $a^2$, of the ordinary construction; but instead of "marvering" it on a flat surface, called a "marver," and "pricking up" the bottom with tools by hand, (a work that requires great manual dexterity and long practice to do properly,) I marver it on a block or shape, A. (Shown in detail in Figs. 11, 12, and 13, representing sectional elevation, plan, and end elevation, respectively.) By turning the metal in this shape it is marvered and pricked up at same time by means of a removable pin, $a$, fixed in center of shape A. The shape may be in any form in which the molten metal is required to be of before being blown out. After the marvering and shaping is done the iron is placed across notch-bearings B B, and blow end of the iron is slid against the blower C or blast-orifice, where it is blown out and blown up to the size of gage, ready for squaring. The blast-orifice is shown in detail in Fig. 8. In this figure, $a^2$ is the blow-pipe; $c'$, a valve; $c^2$, an air or blast chamber supplied with compressed air through pipe $c^3$. $c^4$ is a rubber or other soft elastic lining pressed in by the blow-pipe. This, indeed, may be so shaped as to form a valve, in which case no second valve is required; but I prefer a second valve, as a valve formed of two or more internally-projecting lips is apt to leak in time.

In order to have more freedom in manipulating the blow-pipe the notches are supported on a gauntree pivoted at D. Pipe $c^3$, in order to allow of play, is coupled to air-compressor by an elastic tube or hose-pipe of any suitable material. The glass is now blown cool enough by compressed air coming through a pipe, $c^5$, fixed so that it can be guided to any part of the glass or off altogether when not wanted by lever. The glass, when cool enough, is pressed by hand into a continually-revolving mold, E, (shown in detail, Figs. 9 and 10,) and thus squared. Mold E is held in position on face-plate $e$ by means of set-screws $e^2$ $e^2$, which themselves pass through nuts forming eye-bolts adjustable in slots $e^3$ in plate $e$, and held firmly in place by nuts $e^4$ $e^4$, thereby allowing different-sized molds to be fixed on same face-plate.

Mold E is shaped to the required outside contour of the glass article to be made. The revolving mold E is fixed on the same axial line as the notch-bearings B B and the blower C. In order to give the operator power over any article he may be blowing and to allow the article to be run out to any length required, and blown in while his hand is up behind, the gauntree, with notch-bearings B B and blower C, is made to rock up and down on the axis D at pleasure. The article or tumbler is now blown and ready for cutting off. To do this, the blow-pipe, with the glass article on it, is now passed onto that part of the machine specially depicted in Figs. 1 and 5. In these, F is the driving-shaft. Suspended from this shaft by swinging frame G G is a revolving tubular shaft, $g$.

The iron or blow pipe $a^2$ is put in the revolving tube $g$ of swinger G, and pushed forward until it projects through a concentric chuck or holder, H, at one end of revolving tube $g$, and fits tight at the other or metal end of the iron. This chuck is shown in full detail in Figs. 6 and 7, a (section and end view respectively.) The iron is made fast and centered in this holder by screwing up nut $h$, which presses down wedges $h'$ against the blow-pipe $a^2$, these wedges being carried on springs $i$, fixed to the body of the chuck, which in turn is screwed into shaft $g$. The position of the two shafts longitudinally is regulated by screw J and hand-wheel $j$. Screw J passes through nut $j'$, and is attached to the shaft F by swivel-joint $f$. $g'$ is a pulley driving shaft $g$ by means of a belt and pulley, $g^2$.

K is a sharp-cutting revolving stone or corundum-wheel, driven from shaft F or other convenient point by belt.

The operator, after tightening and centering the blow end of iron in the manner described, screws the swinger longitudinally till the exact point at which it is desired to cut off the tumbler is reached by means of the screw J, and hand-wheel $j$, opposite to the sharp-cutting revolving stone K. I prefer a stone to any metal or composition that I know of at present to cut direct from the iron. The operator now pushes forward the swinger (which oscillates about its own shaft) and presses the revolving glass gently against the revolving stone, when it is almost instantly cut off. It falls into a receptacle made of sheet iron, and placed beneath for that purpose. This is shown in Figs. 16 and 17. By this means the marking, calipering, and shearing by skilled workmen is avoided, and the glass cut much more evenly. To take the iron from swinger, the revolving tube is stopped by shifting the belt onto a loose pulley on the main shaft by means of a belt-guide in the usual way.

It will be obvious that the carriage can be suspended from other shaft than one carried by a gauntree, and if the grindstone-frame be provided with a vertical or lateral movement the carriage can be made to slide solid on the gauntree.

Fig. 16 is a plan, and Fig. 17 an elevation of the apparatus to catch the glass. In this P is a standard attached to the gauntree by bolt $p$. $p'$ is a saddle bolted to standard P by bolts $p^2\,p^2$, passing through slot $p^3$. $p^4$ is a wire-gauze guard, attached to $p'$, and used to keep the glass from the cold metal of $p'$. The glass being cut off, an attendant takes it with wooden pinchers and places it in a mold, L, in any convenient position. This mold has a slot, $l$, at side, and is shown in Figs. 14 and 15. A punty with end shaped as shown in Fig. 18, and filled with hot glass, as shown in section by small dots, is now shoved up through the hole at bottom, which is made just large enough to fit it, and against the tumbler-bottom, being guided so as to be in a straight line by two notches. (Not shown in drawings, but similar to B B, Fig. 1.) The punty is thus accurately centered on the tumbler-bottom. Above this mold a flat wooden casher is fixed on a spring brought into position to press tumbler against punty, and to stick it harder, if necessary. The casher can be actuated by foot, treadle, or hand. When the tumbler is stuck, the operator takes his foot off the treadle and the casher springs clear from top of the mold. He now lifts the tumbler clear of the mold and takes the punty out through the slot at the side of the mold. The piece of flat wood called the "casher," instead of being attached to a spring, may be loose and used by hand each time. The punty, with glass attached, is now put across notched bearings M M, Figs. 2, 3, and 5, on another part of the machine. Opposite to the cold end of the punty there is a revolving chuck, Q, slotted at side to admit a small peg or projection at the side and nearly at the end of the punty. This peg enters the slot as the punty enters the chuck and holds it in position while the article at opposite end is finished. I prefer a punty with a peg to either a screw, round, taper, square, or oval-ended punty, it comes out so much easier. Near the opposite end of the punty when lying in notches M M, the end where the glass is attached, the furnace or glory hole is situated in the axial line of the punty so placed. Therefore all that has to be done after the punty is across the notch-bearings is to slide it forward into the hole, (about the position indicated by letter N,) and when hot enough slide it back again into the revolving chuck, and finish it either by ordinary wood tools or with wood pegs, or a shape fixed above the article upon guides. The revolving chuck Q is worked by fast and loose pulleys. When finished, the operator guides the belt onto the loose pulley $n'$, if necessary, to take the punty out of the chuck. This done the tumbler is knocked off and sent into the leer.

To keep the working-hole hot and guard the operator from the heat while finishing the article, a stopper is used to cover the hole. This is made with a ring or frame of iron, filled with fire-clay and hooked to a chain running over a pulley weighted at opposite end, so that it will run down gently of itself and cover the working-hole. To uncover it, the chain is pulled down. To keep it uncovered, the chain is attached to a peg.

It will be obvious the machine can be made to work either by hand or foot; and for melters at the press I think either would be better than steam-power and more economical, for in pressed work melters only can use it.

I claim as my invention—

1. The marvering shapes or blocks with pin in center for pricking up well-bottom tumblers, substantially as described and shown.

2. In combination with a marver-block, such as A, a pin, $a$, whether removable or solid with it, substantially as and for the purposes described.

3. The combination with notches B B and blow-pipe $a^2$, the blower C, for the purposes described.

4. The blower C, formed of a blast-chamber, $c^2$, supplied with compressed air by a pipe, $c^3$, and armed with elastic lip $c^4$ and valve device to prevent waste of blast, substantially as described.

5. The combination of the shaft F with regulating device J $j$ and the swinging frame G G, carrying a second tubular shaft, $g$, driven from F.

6. The combination of a pivoted frame, G G, carrying a tubular shaft, $g$, driven from the center of pivoting, and a horizontal adjusting device, J, whereby the longitudinal position can be exactly adjusted and the angular position can be altered at pleasure.

7. The combination of a pivoted frame, G, tubular carrying device $g$, rotating holder H, and longitudinal adjusting device J with rotary cutting device K, substantially as and for the purpose described.

8. The holder H, having nut $h$ and wedges $h'$, substantially as described and shown, and for the purpose set forth.

9. The combination of the cutting revolving wheel K and the revolving blow-pipe holding device $g$ with a mechanical adjustment device, J, regulating their respective positions longitudinally to the axis of the cutting-wheel, and hand adjustment regulating the distance apart of the axes of rotation, for the purposes described.

10. In combination with a cutting-off device such as described, an adjustable saddle, $p^4$, placed just below to receive the glass cut-off, substantially as described.

11. The mold L, in shape fitting the article to be made, and having a hole in bottom and slot at side, substantially as described and shown, and for the purpose set forth.

12. The combination of the notches B B, the blower C, a pivoted gauntree supporting the said notches and blower, and the revolving shape E, substantially as and for the purpose set forth.

13. The revolving squaring-mold E, for squaring tumblers formed with complete cylindrical or conical contour inside, substantially as described.

14. In combination with apparatus for holding and rotating an iron, the sharp-edged rapidly-revolving cutting-stone, substantially as described, and for the purpose set forth.

15. The combination of the revolving chuck and the punty, having an end provided with a lateral pin or other projection, shape, or groove corresponding to complementary form in chuck, whereby the punty can be slid upon notches into the chuck and caused at once to revolve, substantially as described.

16. The combination of the mold L, having hole in center and slot extending from that hole through the side of the mold, with guiding-notches to guide the punty exactly true with the center of the hole, substantially as described.

17. In combination with a punty carrying the glass article to be finished, and revolving in guides and chuck, a shape fixed above the article, and capable of being brought down against the said article, whereby the said article can be finished to a standard gage, or, as at present the case, by holding the tools upon the revolving article until finished, substantially as described.

In testimony whereof I have signed my name to this specification in the presence of two subscribing witnesses.

THOMAS WALTON.

Witnesses:
WM. P. THOMPSON,
I. OWDEN O'BRIEN.